United States Patent Office 2,806,569
Patented Sept. 17, 1957

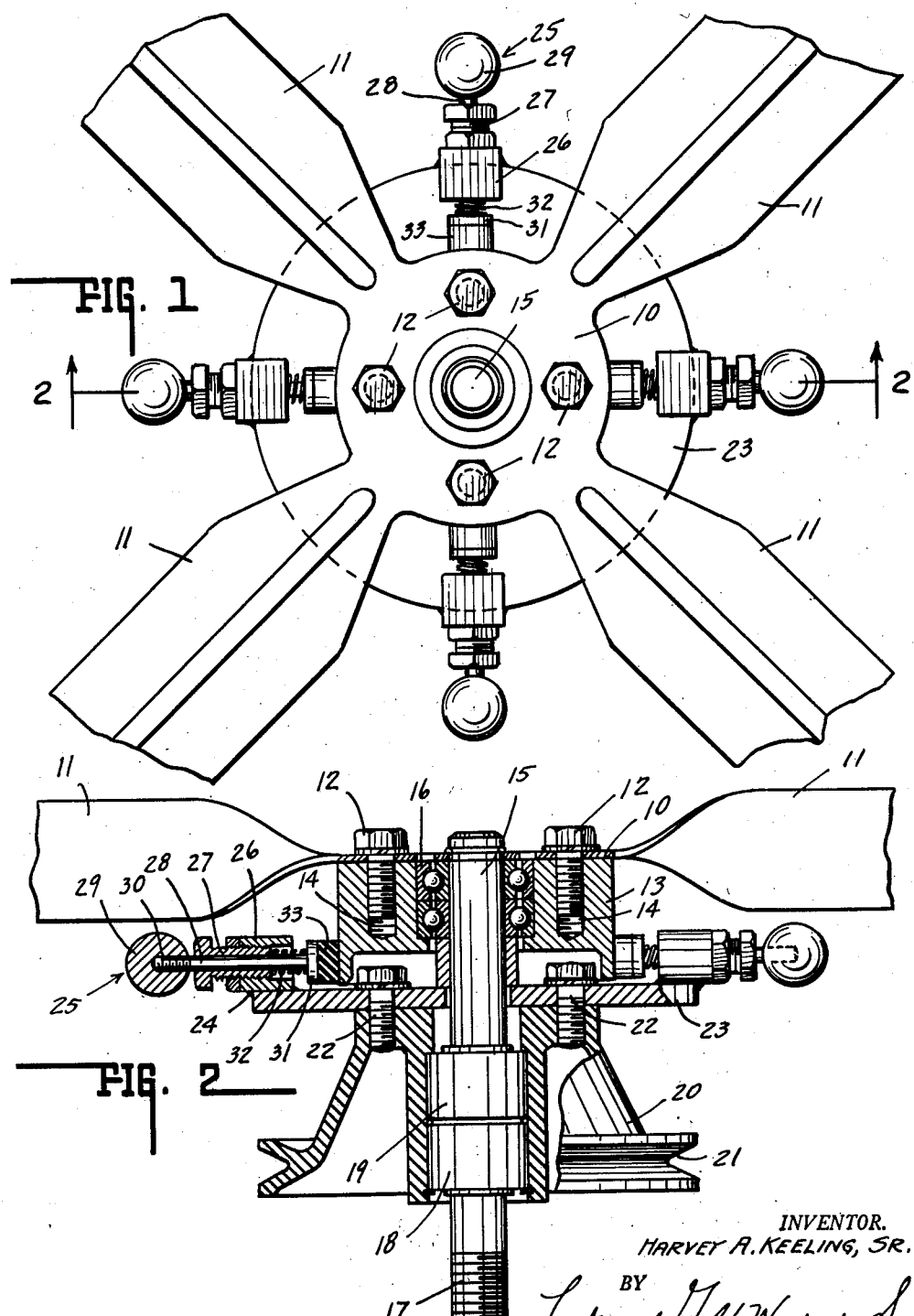

2,806,569

MOTOR VEHICLE FAN REGULATING MECHANISM

Harvey A. Keeling, Sr., Franklin, Ind.

Application November 9, 1953, Serial No. 391,047

2 Claims. (Cl. 192—104)

This invention relates to a motor vehicle fan regulating mechanism.

The primary object of this invention is to provide a fan construction of such character that the noise and vibration resulting from its rotary movement will be eliminated once the motor vehicle is travelling at a predetermined speed.

As is well known, there is a considerable amount of noise in the engine compartment of a motor vehicle because of the vibration of the fan. Elimination of the fan is not feasible because one is needed to creat circulation of air about the cylinder block to assist in the cooling thereof. This is particularly true when the vehicle is proceeding at relatively low speeds for at such times there is little air rushing in through the radiator grill. Once, however, the revolutions per minute are substantially increased there is actually little need for the fan since the air rushes through the grill in ample proportions to cool the block.

The present invention is designed to make possible the full employment of the fan while the motor vehicle is running at lower speeds, while at the same time substantially reducing its rotation once predetermined speeds have been realized. In this manner the noise and vibration resulting from fan rotation will be eliminated. This is accomplished through the provision of a plurality of radially disposed clutching members which are actuated into and out of operating position by spring means and centrifugal force as will hereinafter be described.

A further object of the present invention is to conserve and save at higher motor vehicle speeds that engine horsepower which is conventionally used to rotate the fan assembly. As is well known, a certain amount of horsepower is required to rotate the fan blades. The higher the rate of fan rotation the greater the horsepower required. With the present invention, however, the horsepower used to rotate the fan blades is conserved and saved during higher engine speeds when the fan rotation is stopped or at least reduced.

It is a still further object of the present invention to provide adjustable means for predetermining and controlling the speeds at which the fan rotation is stopped or at least reduced.

The full nature of the invention will be understood from the accompanying drawings and the following description and claims:

Fig. 1 is a front elevation view of the invention with parts broken away.

Fig. 2 is a transverse section view thereof taken on lines 2—2 of Fig. 1 in the direction of the arrows.

In the drawings the fan hub or web is shown at 10 with the fan blades extending radially therefrom at 11. The fan may be of any conventional type, it being understood that the present invention does not reside in its construction. The web is suitably secured by the threaded bolts 12 or any other suitable means to an annular drum 13 having threaded bores 14 formed therein for reception of the bolts. The drum is in free floating relation to the stationary fan shaft 15, it having a pair of anti-friction bearings 16 disposed between it and the shaft.

The inner end of the shaft is threaded at 17 so that it may be mounted in the conventional way in the cylinder block or the like of a motor vehicle engine. Disposed in spaced relation from the threaded end of the shaft are the double bearings 18 and 19. Enveloping the bearings in friction fit relation is the drive pulley 20 having a V groove 21 in which is trained the conventional V belt (not shown). The pulley is connected in the usual way to the crank shaft of the engine and is rotated thereby.

Bolted by the bolts 22 or other suitable means to the pulley assembly is the annular disc 23. Thus any movement imparted to the pulley by the crank shaft through the medium of the V belt will be followed by the disc which is secured to the pulley assembly.

Suitably welded to the disc as at 24 are the centrifugally actuated mechanisms shown generally at 25. A plurality of these mechanisms is employed, four being shown for the purpose of illustration in Fig. 1 of the drawings. Each mechanism extends radially relative to the axis of the shaft.

Each mechanism consists of a sleeve or housing 26 which, as aforementioned, is suitably welded or otherwise secured adjacent the periphery of the disc. A longitudinal bore is formed through the housing, a portion thereof being threaded for reception of the adjustable screw 27. Mounted in sliding relationship within a bore formed in the screw, and extending therethrough is the stem 28. The outer end of the stem mounts the weight 29 which in the drawings is illustrated as being a ball. It is to be understood, of course, that any other weighted member will be satisfactory for the purpose of the invention. The ball illustrated has formed therein a threaded bore for reception of the threaded outer end 30 of the stem.

The inner end of the stem terminates in a right angularly disposed head 31 of cylindrical conformation. Interposed between its face and the inner face of the screw 27 is a compression spring 32 which envelops the stem. This spring constantly urges the head 31 inwardly in the direction of the drum. Suitably secured to the face of the head opposite to that against which the spring bears is the shoe 33 which is illustrated as being of rubber but which may be of any other relatively resilient material. As shown particularly in Fig. 2 the spring normally biases the shoe into engagement with the drum 13. Thus the movement of the disc 23 moves the mechanism 25; the shoe portion 33 of the mechanism causes the drum to move when the two are in engagement; and the fan, which is secured to the drum is also rotated thereby.

In operation the pulley 21 is rotated by the crank shaft and at the same rate of speed therewith. As long as the engine is turning at relatively low revolutions per minute, i. e. as long as the motor vehicle is travelling at a relatively low rate of speed, it is highly desirable that the cooling effects of fan rotation be preserved. This is accomplished by connecting the otherwise free floating drum 13 and the fan secured to it, to the pulley through the medium of the mechanism 25 and the disc 23. Once, however, the velocity of the motor vehicle is increased to a predetermined point, the centrifugal force generated by the weighted members 29 will move the stems 28 outwardly against the constraint of the springs so that the shoes are no longer in engagement with the drum. At such times the rotation of the fan will be reduced almost completely since it no longer will have driving connection with the pulley. While the fan will continue to rotate to a slight extent because of the impact upon its blades of the air rushing in through the radiator grill, its rotation will be at such a low rate as to eliminate noise and vibration that stems from its rapid rotation. Furthermore, at such times the horsepower which is normally consumed in causing the fan blades to bite through the air is conserved and saved.

By reason of the construction of the mechanism identified generally at 25 the point at which the centrifugal force will overcome the bias of springs may be controlled by adjusting the screw 27. By turning it inwardly the spring is compressed to a greater extent thereby making it necessary that greater centrifugal force be applied before the shoes will be moved out of engagement with the drum. On the other hand, by turning the adjusting screws outwardly the opposite effect will follow.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. In a speed responsive clutch, a drive member and a driven member arranged in coaxial relationship, an annular drum secured coaxially to one of said members, a disk of greater diameter than said drum secured to the other of said members, a plurality of sleeves affixed to said disk beyond the outer periphery of said drum and with their axes radiating from the axis of said members, a centrally bored screw threaded axially in each of said sleeves, a stem slidably mounted in each of said bores, a head on the inner end of each stem, a shoe on each head, an expansion spring encircling each of said stems seated at one end in its respective sleeve and against said head at its opposite end whereby said shoes are normally urged against the outer periphery of said drum, and a weight secured to the outer end of each of said stems.

2. In a speed responsive clutch, a drive member and a driven member arranged in coaxial relationship, an annular drum secured coaxially to one of said members, a disk of greater diameter than said drum secured to the other of said members coaxially therewith, a plurality of sleeves affixed to said disk beyond the periphery of said drum with their axes radiating from the axis of said members and disposed adjacent said drum, a centrally bored screw threaded axially in each of said sleeves with their inner ends disposed within the inner ends of said sleeves, a stem mounted for longitudinal sliding movement in each of said bores, a head on the inner end of each stem, a shoe on each head, an expansion spring encircling each stem engaged at its inner end with its respective head and at its outer end with said screw to normally hold said shoes against said drum, and a weight secured to the outer end of each stem.

References Cited in the file of this patent

UNITED STATES PATENTS

| | | |
|---|---|---|
| 219,558 | Worick | Sept. 9, 1879 |
| 994,764 | Loomis | June 13, 1911 |
| 1,782,513 | Roos | Nov. 25, 1930 |
| 1,827,039 | Ragan | Oct. 13, 1931 |
| 2,005,486 | Wilson | June 18, 1935 |
| 2,255,420 | Graham | Sept. 9, 1941 |
| 2,678,031 | Spase et al. | May 11, 1954 |
| 2,758,689 | Spase | Aug. 14, 1956 |

FOREIGN PATENTS

| | | |
|---|---|---|
| 15,355 | Great Britain | 1907 |